Sept. 19, 1967   E. ASCOLI ETAL   3,342,936
CIRCUIT FOR PRODUCING COMPLEX ELECTRIC SIGNALS OF
PREDETERMINED AMPLITUDE AND PHASE FOR
CONTROLLING CHARACTER FORMING MEANS
Filed Oct. 18, 1965   11 Sheets-Sheet 1

| Signes | Sorties | |
|---|---|---|
| | X | Y |
| A | 25 | 58 |
| B | 36 | 26 |
| C | 19 | 50 |
| D | 36 | 13 |
| E | 40 | 27 |
| F | 41 | 59 |
| G | 21 | 58 |
| H | 11 | 38 |
| I | 60 | 4 |
| J | 15 | 56 |
| K | 36 | 45 |
| L | 9 | 1 |
| M | 31 | 39 |
| N | 11 | 61 |
| O | 25 | 4 |
| P | 9 | 53 |
| Q | 54 | 51 |
| R | 36 | 56 |
| S | 49 | 50 |
| T | 43 | 16 |
| U | 22 | 13 |
| V | 25 | 23 |
| W | 2 | 39 |
| X | 35 | 45 |
| Y | 52 | 13 |
| Z | 29 | 28 |
| 1 | 10 | 18 |
| 2 | 49 | 48 |
| 3 | 37 | 17 |
| 4 | 55 | 14 |
| 5 | 62 | 17 |
| 6 | 33 | 42 |
| 7 | 19 | 16 |
| 8 | 35 | 4 |
| 9 | 34 | 44 |
| ( | 20 | 4 |
| ) | 24 | 4 |
| / | 57 | 4 |
| + | 43 | 47 |
| - | 25 | 60 |
| , | 24 | 7 |
| — | 4 | 5 |
| \ | 20 | 8 |
| ^ | 6 | 12 |
| ' | 24 | 8 |
| ◊ | 25 | 3 |

| Signes | Sorties | |
|---|---|---|
| | X | Y |
| × | 35 | 46 |
| * | 68 | 67 |
| ⊥ | 70 | 69 |
| = | 35 | 66 |
| ‖ | 66 | 64 |
| : | 60 | 65 |
| ? | 72 | 71 |
| . | 60 | 32 |
| £ | 63 | 51 |
| # | 74 | 73 |
| ' | 60 | 25 |
| " | 66 | 35 |
| | | |
| ¶ | 47 | 52 |
| & | 30 | 56 |
| § | 30 | 42 |

*FIG. 10*

| Sorties | Signes | |
|---|---|---|
| | X | Y |
| 1 | | L |
| 2 | W | |
| 3 | | ◊ |
| 4 | — | 108/() |
| 5 | | — |
| 6 | ∧ | |
| 7 | | ´ |
| 8 | | ∧ |
| 9 | LP | |
| 10 | 1 | |
| 11 | NH | |
| 12 | | ∧ |
| 13 | | DUY |
| 14 | | 4 |
| 15 | J | |
| 16 | | T 7 |
| 17 | | 35 |
| 18 | | 1 |
| 19 | C 7 | |
| 20 | ( | |
| 21 | G | |
| 22 | U | |
| 23 | | V |
| 24 | ),' | |
| 25 | AOV-◊ | I |
| 26 | | B |
| 27 | | E |
| 28 | | Z |
| 29 | Z | |
| 30 | & & | |
| 31 | M | |
| 32 | | |

| Sorties | Signes | |
|---|---|---|
| | X | Y |
| 33 | 6 | |
| 34 | 9 | |
| 35 | X 8 x = | II |
| 36 | BDKR | |
| 37 | 3 | |
| 38 | | H |
| 39 | | MW |
| 40 | E | |
| 41 | F | |
| 42 | | 6 & |
| 43 | T + | |
| 44 | | 9 |
| 45 | | K X |
| 46 | | x |
| 47 | ♀ | + |
| 48 | | 2 |
| 49 | S 2 | |
| 50 | | C S |
| 51 | | Q L |
| 52 | Y | ♀ |
| 53 | | P |
| 54 | Q | |
| 55 | 4 | |
| 56 | | J R 8 |
| 57 | / | |
| 58 | | A G |
| 59 | | F |
| 60 | \|. :\| | — |
| 61 | | N |
| 62 | 5 | |
| 63 | £. | |
| 64 | | \|\| |

| Sorties | Signes | |
|---|---|---|
| | X | Y |
| 65 | | : |
| 66 | \|\| \|\| | = |
| 67 | | ✶ |
| 68 | ✶ | |
| 69 | | ⊥ |
| 70 | ⊥ | |
| 71 | | ? |
| 72 | ? | |
| 73 | | # |
| 74 | # | |

FIG. 11

United States Patent Office 3,342,936
Patented Sept. 19, 1967

3,342,936
CIRCUIT FOR PRODUCING COMPLEX ELECTRIC SIGNALS OF PREDETERMINED AMPLITUDE AND PHASE FOR CONTROLLING CHARACTER FORMING MEANS
Enzo Ascoli, Lausanne, and Valerio Barbina, Renens, Switzerland, assignors to Paillard S.A., Sainte-Croix, Vaud, Switzerland, a corporation of Switzerland
Filed Oct. 18, 1965, Ser. No. 496,836
Claims priority, application Switzerland, Mar. 31, 1965, 4,438/65
3 Claims. (Cl. 178—30)

ABSTRACT OF THE DISCLOSURE

Circuit for producing a plurality of complex electric control signals for forming clearly distinguishable letters, numbers and signs, which normally compose a typewriter keyboard, wherein said signals represent the signals applied to the coordinate deflection axes of a character forming and displaying device for forming the letters, numbers and signs. The circuit forms the complex signals from two DC voltages of opposite polarity, and two groups of four sinusoidal voltages each, where the four voltages of one group have the same frequency and are successively displaced in phase by 90°, and the four voltages of the other group are double the frequency of the voltage of the first group and are also successively displaced in phase by 90°. A further sinusoidal signal in a predetermined phase relation with one of the sinusoidal voltages of the first group is utilized by said circuit to form the complex control signals to provide clearly distinguishable characters.

Background of the invention

Various arrangements have already been proposed for supplying electric signals for controlling indicating or marking means energized at least by two electric signals defining the two components along corresponding co-ordinate axes of the displacements to be executed for forming a symbol.

Such arrangements have been proposed chiefly for controlling indicating arrangements showing or drawing digits. When the indicating or marking means are to show in addition to figures, letters and usual punctuation signs, it becomes a very intricate matter to supply electric signals capable of operating the indicating arrangement to form clearly distinguishable characters.

In the Swiss Patent 384,596, and U.S. Patent 3,182,126, issued May 4, 1965, there are described comparatively simple arrangements supplying the desired control voltages which allow controlling in their turn means for indicating or marking all the alphabet letters, together with the digits and usual punctuation signs and the like which form part of the conventional composition of a typewriter keyboard.

Summary of the invention

The present invention relates to an arrangement of the same type which is considerably simplified through the use of auxiliary input voltages. Said arrangement supplies electric signals controlling means for indicating or marking symbols, which means are energized by at least two electric signals corresponding to the two components, along corresponding coordinate axes, of the shifting to be executed for the drawing of any one of said symbols, including capitals, small letters and digits, forming part of the normal composition of a typewriter keyboard. To this end, there are provided an electric generator supplying in a continuous manner a number of periodical electric waves of different shapes and frequencies together with circuits producing for each of the symbols to be recorded the shapes and frequencies of the waves which are required for the energization of the drawing means which allow recording the symbols to be considered, while means are provided for selecting these waves for each of the symbols to be recorded. Said circuits are fed by two groups of four voltages (A to D and E to H) which are substantially sinusoidal, the four voltages (A to D) of one group having the same frequency, but being phase-shifted with reference to one another by 90°, whereas the four voltages of the other group E to H have a frequency double that of the first-mentioned group and are also phase-shifted by 90° with reference to one another, and by two further D.C. voltages of opposite polarities. According to our invention, said circuits are furthermore fed by at least one further voltage which is substantially sinusoidal and the frequency of which is equal to the first-mentioned frequency and phase-shifted by $$n\frac{\pi}{4}$$

with reference to one of the voltages of the first group, $n$ being an integer smaller than 8 and said further voltage being positively or negatively biased with reference to its effective value.

Brief description of the drawings

The accompanying drawings illustrates diagrammatically and by way of example a preferred embodiment of this improved arrangement. In said drawings:

FIG. 10 illustrates for each of the symbols to be drawn or displayed, the signal components to be selected so as to ensure the desired horizontal deflection and the desired vertical deflection.

FIG. 11 is a chart indicating the use of each of the seventy-four signals adapted to form the different symbols, letters and digits which the arrangement illustrated provides for marking or displaying by means of the horizontal and vertical signal components which may be supplied.

Description of the preferred embodiment

Figure 1:
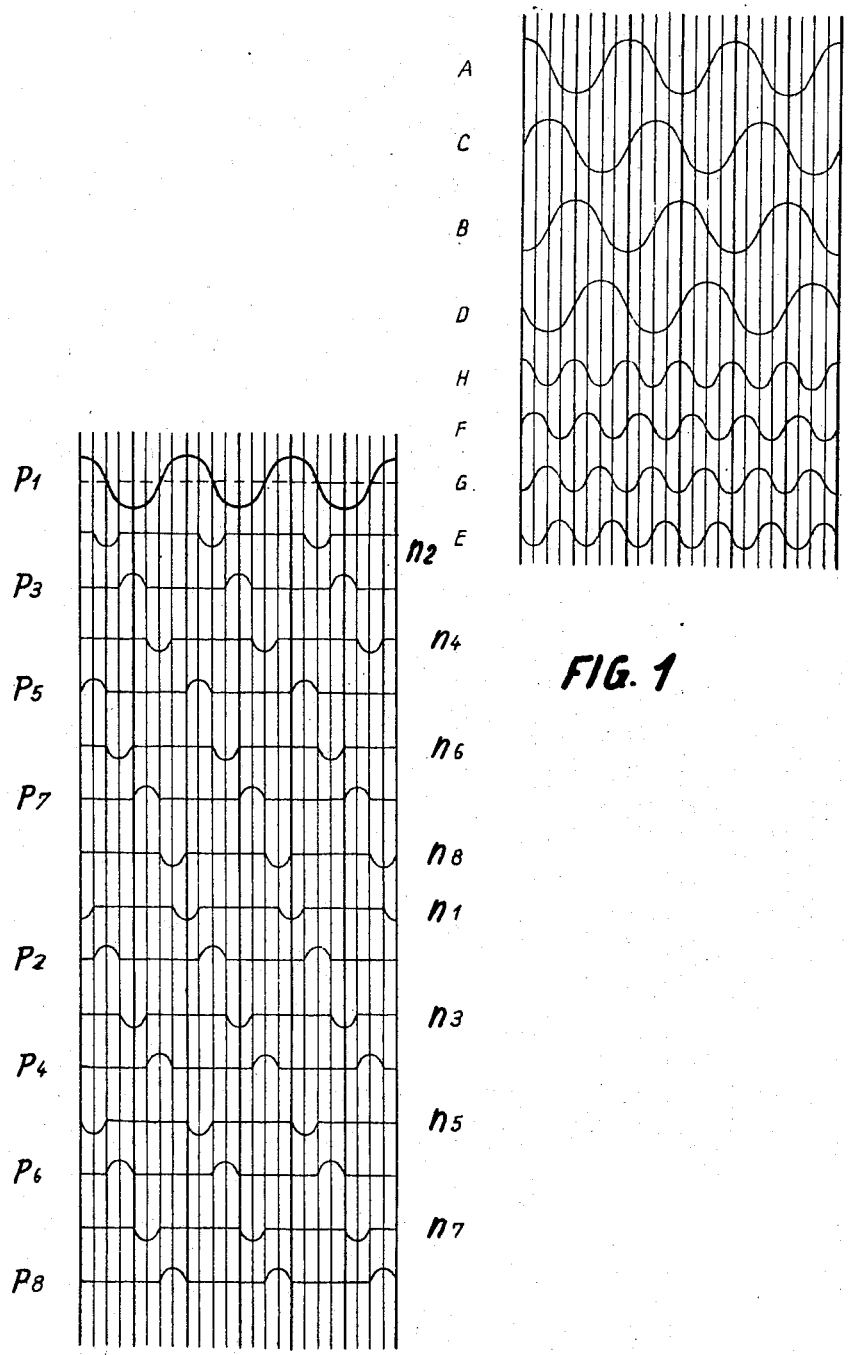
FIG. 1 shows the curves defining the twenty-four voltages which may be obtained by means of the electric generator feeding the arrangement.
Figure 2:
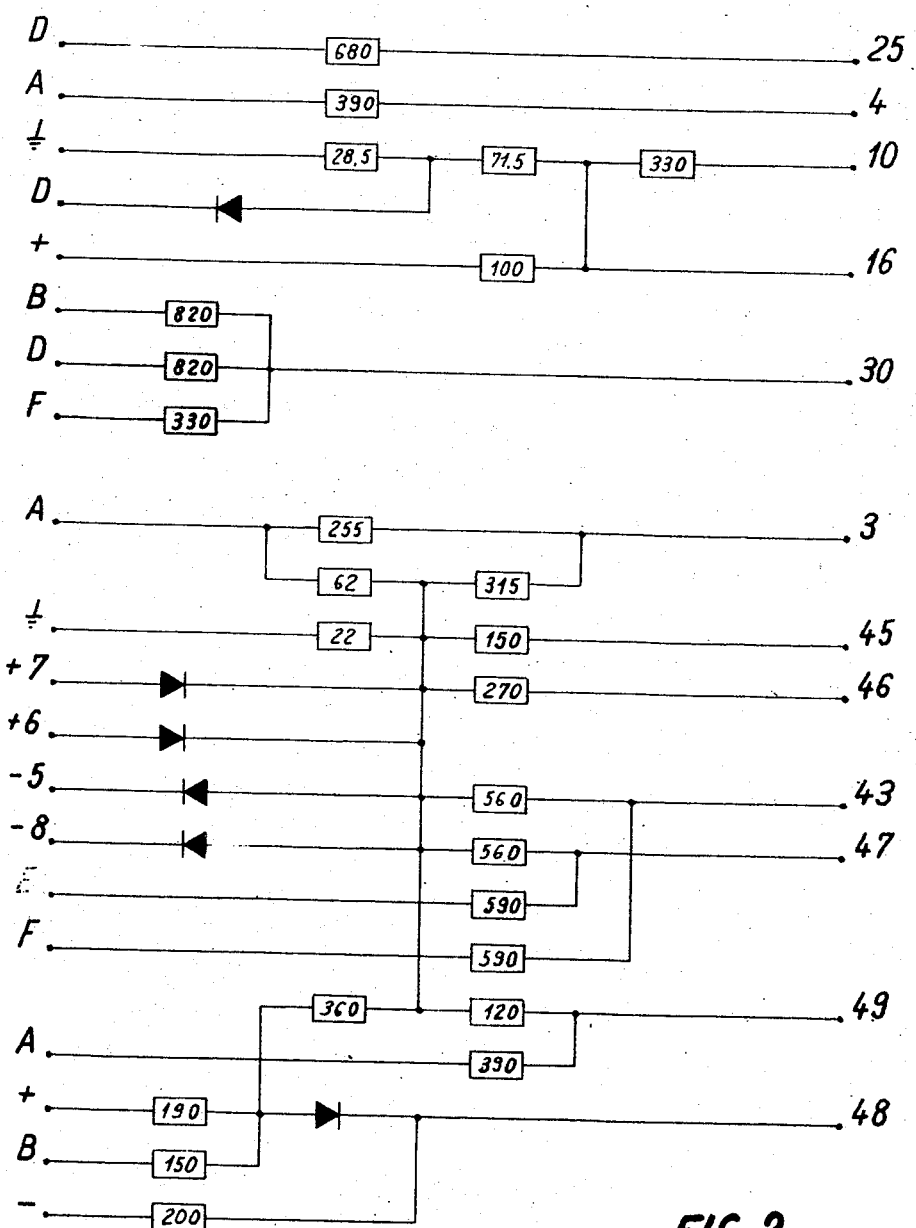
FIGS. 2 to 9 are wiring diagrams showing the supply of the horizontal and vertical signals controlling data marking or displaying means for the formation of the desired symbol components.

Turning to FIG. 1, the latter shows that the generator feeding the arrangement supplies two groups of four sinusoidal voltages. The first group supplies a voltage A of a predetermined frequency, a voltage B of the same frequency, but phase-shifted by 180° with reference to the voltage A, a voltage C phase-shifted by 90° with reference to the voltage A and a voltage D which is phase-shifted by 270° with reference to the voltage A.

The voltages of the second group are illustrated by E, F, G and H and show a frequency double that of the voltages of the first group. The voltage F is phase-shifted by 180° with reference to the voltage E and the voltages G and H are phase-shifted respectively by 90° and by 270° with reference to the voltage E. All the voltages of a same group have the same amplitude and the voltages of the first group have an amplitude double that of the voltages of the second group.

The arrangement is also fed with two D.C. voltages of opposite polarities, the common absolute value of which is substantially equal to 1.25 times the maximum amplitude of the voltages of the second group E, F, G, H.

The generator supplies also sixteen further voltages which are substantially sinusoidal, and the frequency of which is equal to that of the voltages A to D of the first group. The successive further voltages are phase-shifted by $$n\frac{\pi}{4}$$

with reference to each other, n being an integer and they are biased by a positive or negative voltage which is equal to the effective value of said voltages.

In FIG. 1 there are also shown the curves of the voltages corresponding to said further sixteen voltages when only a fraction thereof is tapped off by means of a diode in the usual manner. The negatively biased voltages, after they have passed through a diode, produce positive pulses designated by p1 to p8 whereas it is possible to obtain negative pulses n1 to n8 starting from the positively biased voltages. The further voltage p1 is in phase with the voltage A of the first group inasmuch as the maximum positive alternation of p1 registers in time with the maximum positive alternation of the voltage A.

The voltages p2, p3 and p4 are phase-shifted by successive angles π/2 with reference to the voltage A.

The voltage pulses p5 to p8 show also successive phase-shiftings by π/2 but p5 is furthermore phase-shifted by π/4 with reference to the voltage A. Thus, the whole system of voltages p1 to p8 includes positive voltages showing with reference to one another a succession of phase shiftings by π/4 with reference to any selected one of the voltages A to D of the first group.

Similarly, the voltages n1 to n8 show successive phase shiftings by π/4. After each of said voltages is passed through a rectifier, there is obtained in the usual manner a negative pulse in the shape of a peak of a sinusoidal alternation at basic frequency.

The circuit arrangement illustrated in FIGS. 2 to 9 supplies the complex signal voltages required for forming the symbols illustrated in FIGS. 10 and 11. This arrangement is constituted by a plurality of circuits which are partly separate and partly associated. The input terminals of all the circuits are arranged on the left hand side and in registry with each terminal there is recorded the reference number of the voltage illustrated in FIG. 1 which is to be applied to the terminal considered from the generator and power supply. It should be remarked now that the terminals designated by p1 to p8 or n1 to n8 are fed by an A.C. voltage together with a D.C. biasing voltage, whether negative or positive, which is equal to the effective voltage of said A.C. voltage. The output pulses are obtained by rectifying means illustrated in the circuit diagrams of FIGS. 2–9, and the output signals formed by the rectifying means or diodes and resistors in the circuits are fed to the output terminals. The output terminals of said circuits are shown on the right hand side and are numbered from 1 to 74.

The numbers corresponding to said output terminals are each shown in FIG. 10 in registry with the symbol to be recorded. The signals on the terminals listed for each letter are fed to the X and Y coordinate deflection plates or the like, such as the deflection plates of a cathode ray tube or the deflection means for electromagnetically displacing a tracer organ, as shown in Patent 3,087,772 to form the letters. Thus, in registry with the letter A (FIG. 10), the output terminals 25 and 58 are given out in the reference columns X and Y. This means that when using the output signal 25 for the horizontal deflection and the output terminal 58 for the vertical deflection in the indicating means, the deflection of which is controlled electrically, for instance by means of a cathode ray oscilloscope, the letter A is marked or formed by the indicating means.

FIG. 11 is a further chart showing for each output terminal the symbol or symbols for which the corresponding output signal may be used.

The two D.C. biasing voltages have been designated respectively by + and −. A number of terminals are connected with a constant voltage intermediate between said two biasing voltages. Said terminals are designated by the conventional signals showing they are grounded. In the elementary circuit, in FIG. 8, leading to the output 71, one input terminal carries the reference letter I, which means that it is connected with the point I appearing in the elementary circuit connected with both output terminals 37 and 39, in FIG. 3.

All the circuits shown in FIGS. 2–9 are formed by the assembly of resistances and diodes in the usual manner for pulse forming circuits. Said circuits are not described in detail in the present specification, since their illustration is much clearer and more accurate than an actual description, and since the signals obtained from the circuits to form clearly distinguishable letters, numbers and signs, are the important feature and these signals are related to the input signals illustrated and described.

The values shown on the resistances, which are shown as rectangles in the drawings, are given out in kilo-ohms, said values being selected for the case where the generator supplies voltages of the first group which have a maximum amplitude of 6 volts and voltages of the second group of an amplitude of 3 volts. The D.C. voltages are then equal to +3.75 volts and −3.75 volts.

Since the circuits include only resistances and diodes, they allow operating without any distorsion within a very broad range of frequencies.

The complex electric signals collected across the terminals of the output terminals 1–74 illustrated in FIGS. 2 to 9 can be selected by arrangements which are not illustrated in FIGS. 2 to 9, so as to feed after amplification, to the deflecting electrodes of a writing head, for instance of the type described in the Swiss Patent 356,477, U.S. Patent 3,182,126, or the deflecting electrodes of a cathode ray tube. Such selecting means wherein the input impedance is equal to 100 kilohms are not illustrated, since they form no part of the present invention and they may be designed in a very simple manner by means of switches actuated by the keyboard keys of a typewriter somewhat along the lines of the selecting means in Patent 3,182,126. In any event the characters are formed if the stated terminals are touched or connected to the designated deflecting plate.

Figure 9:
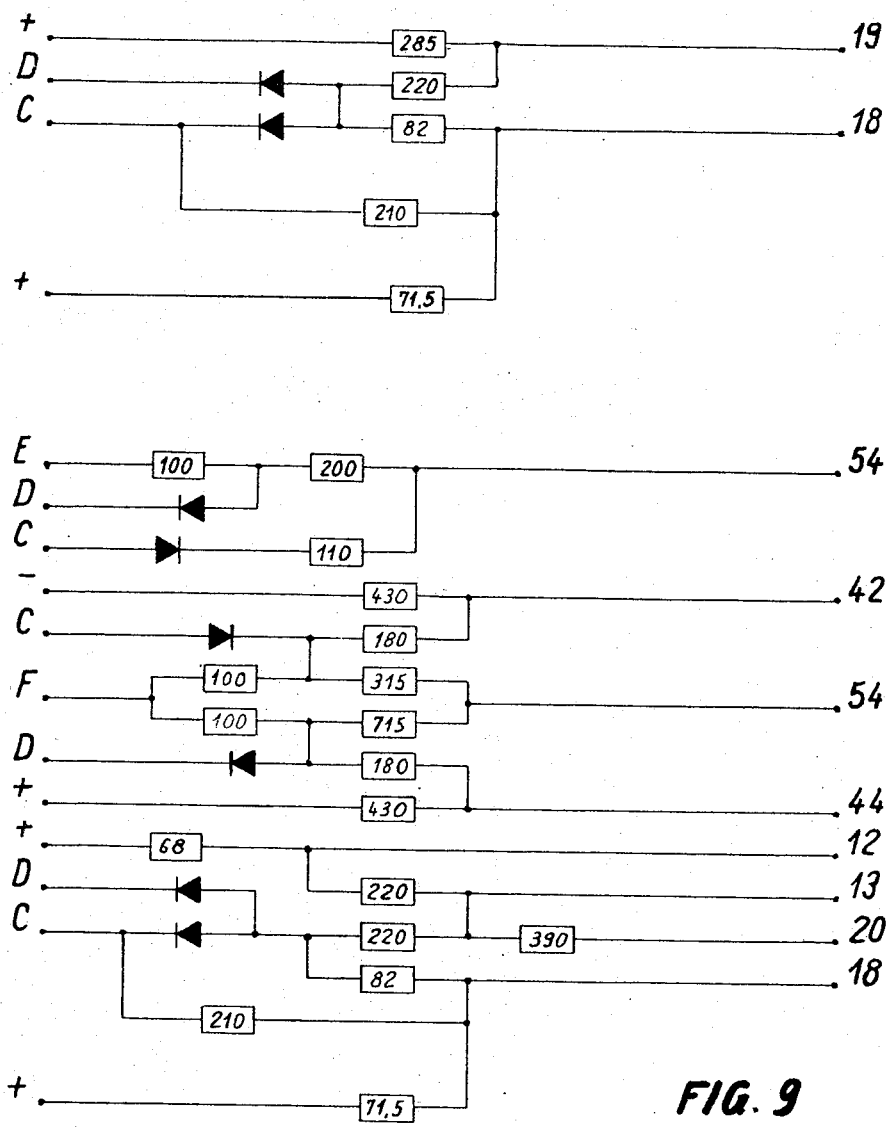

It should also be remarked that certain modifications may be brought to the circuits illustrated and FIG. 9 shows in particular two modifications for the obtention of output signals 18 and 19 and of the output signals 54. It is thus apparent that a first possibility of obtaining the signal 54 is provided by a signal including two diodes and three resistances of 100, 110 and 200 kilohms respectively. Said circuit should be fed by the voltages C, D and E. Immediately underneath said circuit, there is illustrated the circuit which allows obtaining the voltages 42 and 44 and it is apparent that one of the points of said further circuit is subjected to a potential corresponding to 54. It is thus possible to tap off directly said output signal on the circuit producing the signals 42 and 44 without any further expense in the appliances.

Figure 3:
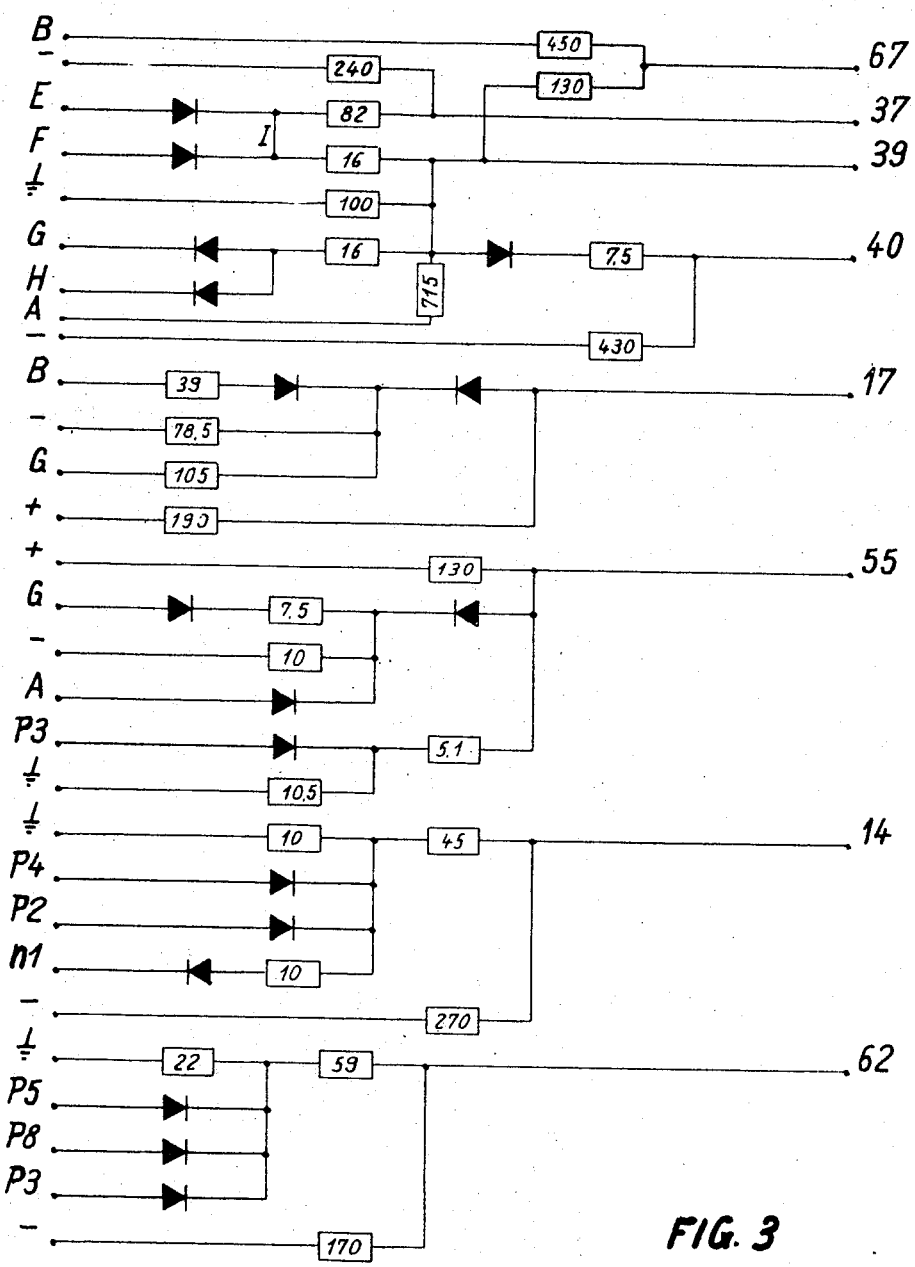
Figure 4:
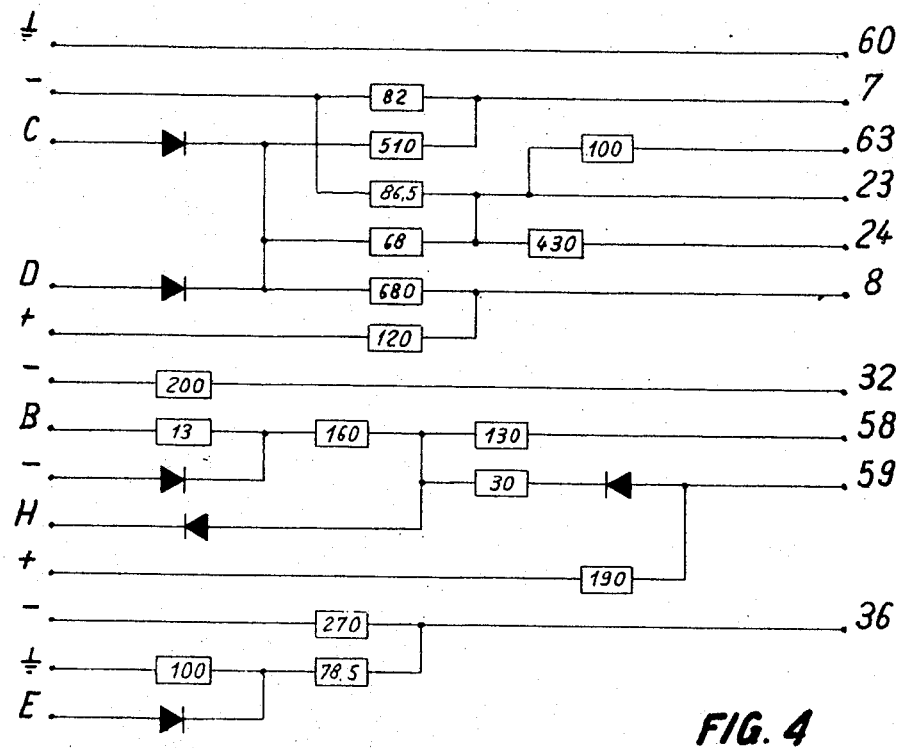
Figure 5:
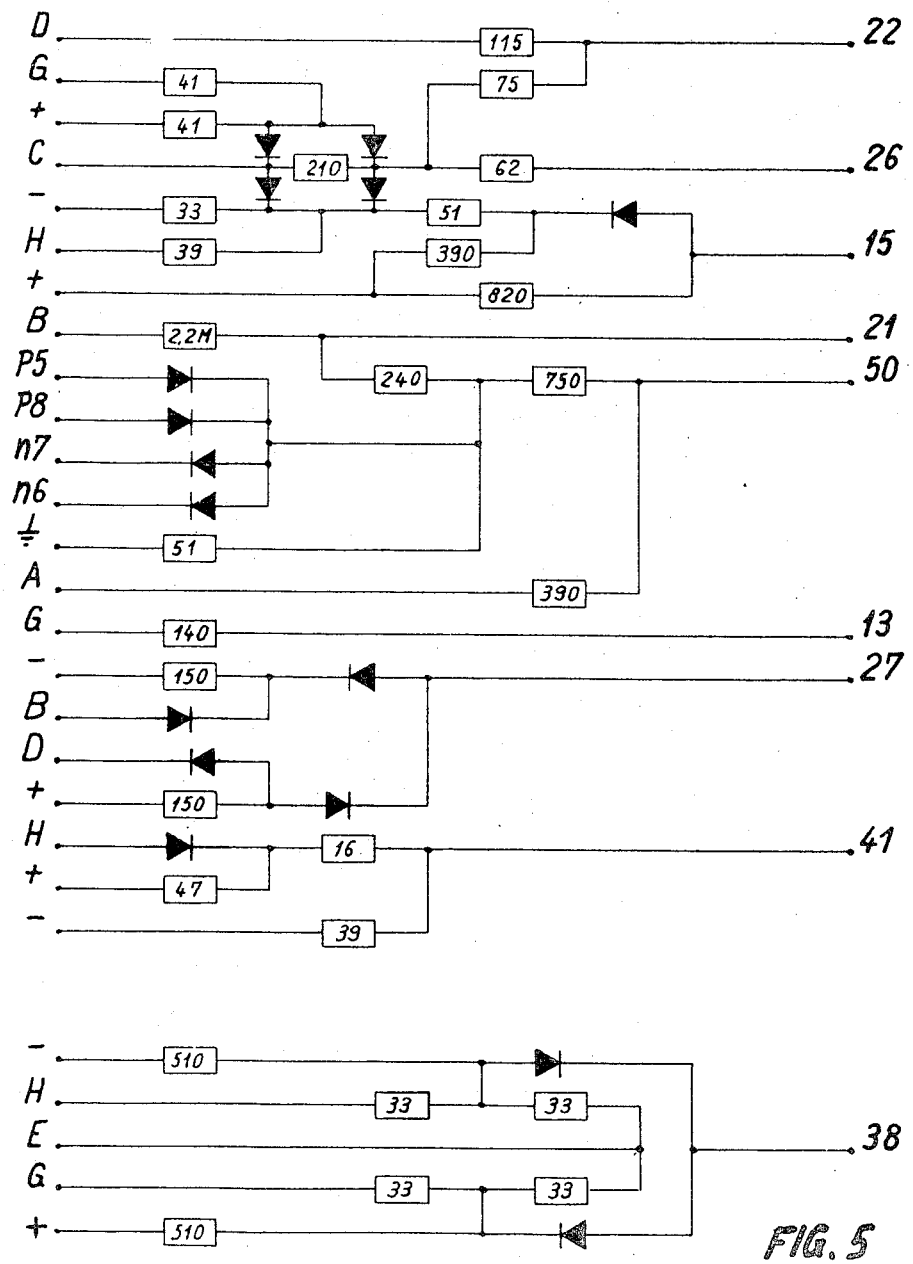
Figure 6:
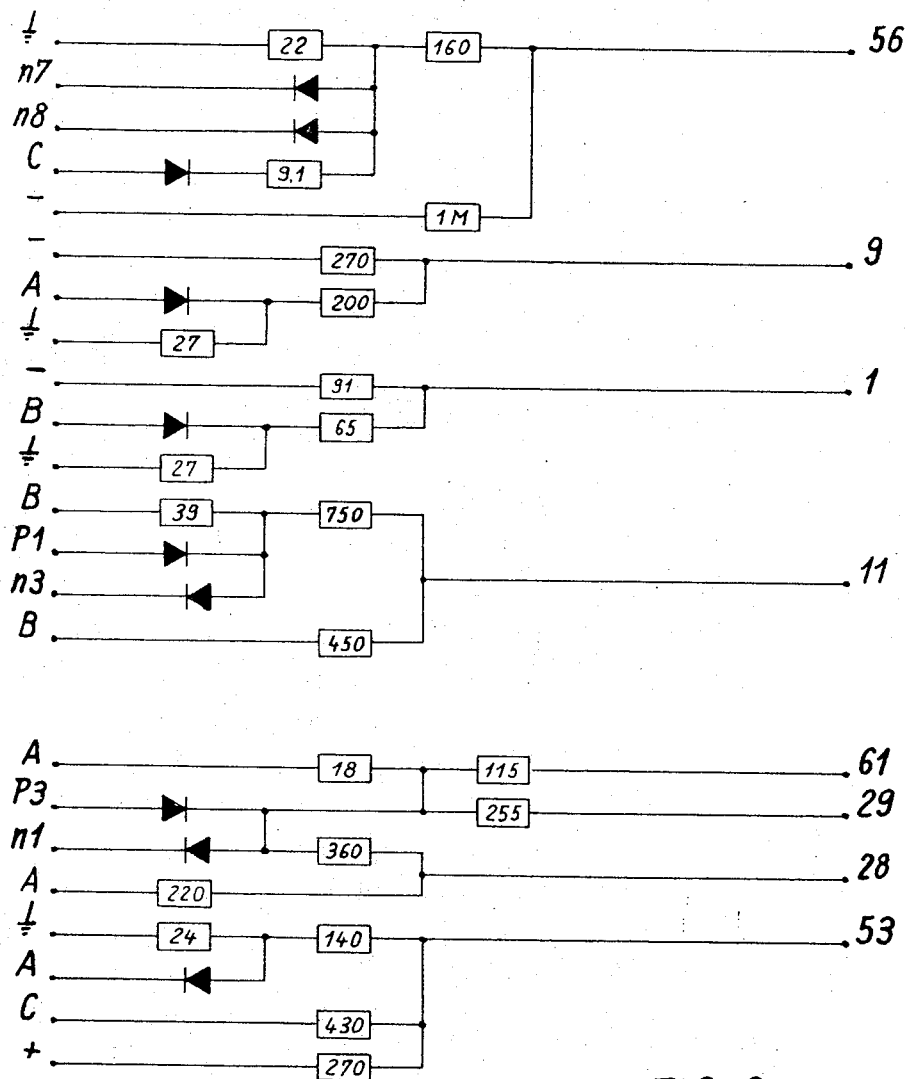
Figure 7:
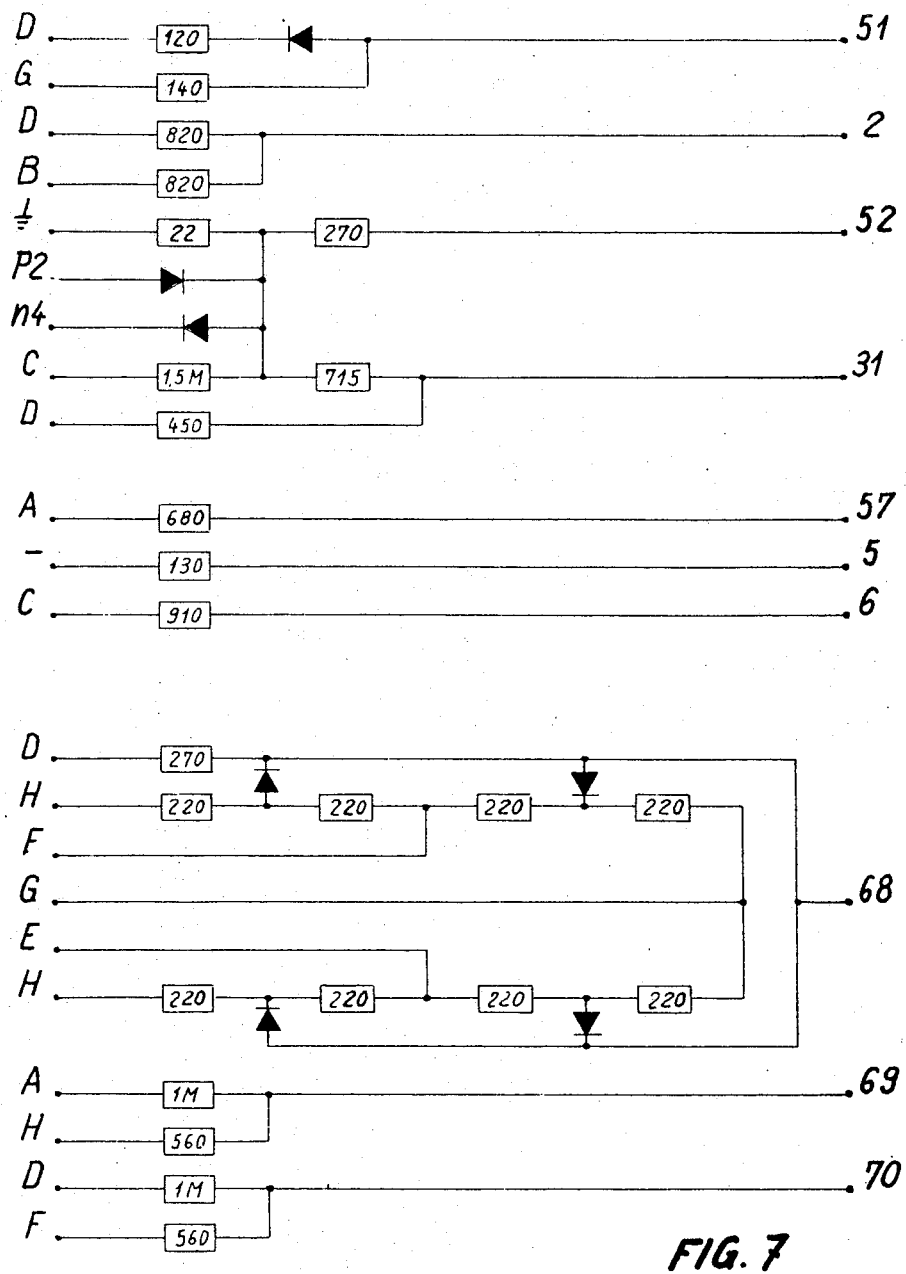
Figure 8:
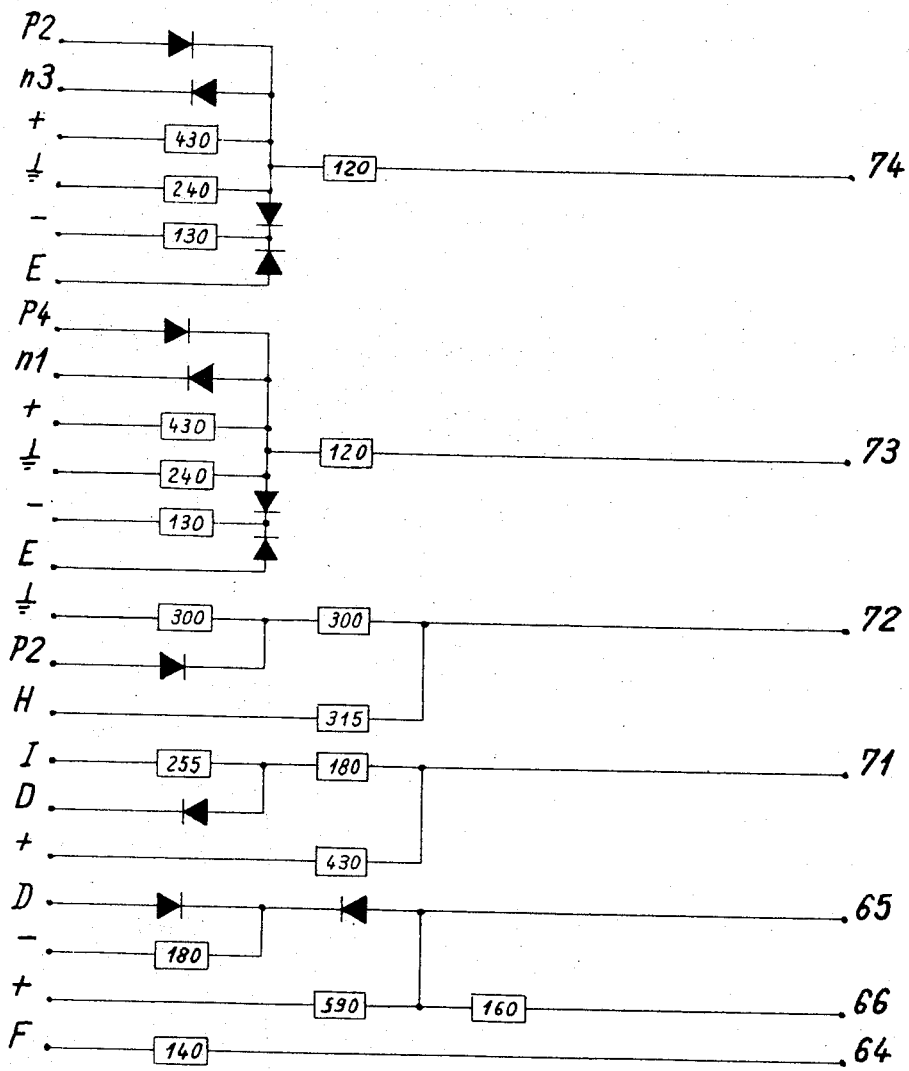

The voltages A to H, p1 to p8 and n1 to n8 may be produced readily by a generator such as that disclosed in the Swiss patent application 8,000/64. In FIG. 3 of said patent application, are shown the points carrying the reference letters p1 to p8 and n1 to n8 at which may be tapped off, by means of a rectifying diode which is not illustrated, the voltages corresponding to the voltages p1 to p8 and n1 to n8 of the present specification. In any event the mentioned voltages may be produced by standard phase shifting generator means known in the art since the invention resides in the particular phasing, etc., of the signals to produce the clearly distinguishable characters.

Of course the described circuits may be modified. If the values of certain resistors are changed, the shape of the symbols will be modified. Obviously also, if all the resistances are modified in the same ratio so that their values remain proportional to the values disclosed in the drawing, no modification is obtained in the shape of the symbols recorded.

We claim:

1. In a circuit for supplying electric controlling signals defining the signal components along two coordinate axes which correspond to the different sections of the symbols of the typewriter keyboard type to be formed, along those axes, comprising a generator means connected to produce in a continuous manner two groups of four substantially sinusoidal voltage signals, the four voltage signals of one group being of a same basic frequency and of a same amplitude and phase shifted with reference to one another by $\pi/2$, the four voltage signals of the second group being of a same frequency substantially double the basic frequency and of a same amplitude of said one group and phase shifted with reference to one another by $\pi/2$, a source of at least two D.C. voltages of opposite polarities, at least one further substantially sinusoidal voltage signal produced by said generator means at said basic frequency and shifted by $$n\frac{\pi}{4}$$

with reference to one of the voltage signal of said one group, wherein $n$ is an integer, and said further voltage signal being biased by a said D.C. voltage of a predetermined sign equal to its effective value, and a plurality of circuits having inputs connected to said generator means and source of D.C. voltages, said inputs fed by said voltage signals, said one further voltage signal, and said D.C. voltages and adapted to produce electric controlling signals for each symbol defining the deflection signal components along two coordinate axes for producing the desired symbol.

2. In a circuit for supplying electric controlling signals defining the signal components along two coordinate axes which correspond to the different sections of the symbols of the typewriter keyboard type to be formed, along those axes, comprising a generator means connected to produce in a continuous manner two groups of four substantially sinusoidal voltages, the four voltages of one group being of a same basic frequency and of a same amplitude and phase shifted with reference to one another by $\pi/2$, the four voltages of the second group being of a same frequency double the basic frequency of said one group and of a same amplitude and phase shifted with reference to one another by $\pi/2$, a source supplying at least two D.C. voltages of opposite polarities, at least sixteen further substantially sinusoidal voltages produced by said generator means at said basic frequency, of which eight of said further voltages are biased positively by a said D.C. voltage equal to their effective value and are shifted by successive angles $\pi/4$ with reference to one of the voltages of said one group, and eight of said further voltages are biased negatively by a said D.C. voltage equal to their effective value and are shifted by successive angles $\pi/4$ with reference to one of the voltages of said one group, and a plurality of circuits having inputs connected to said generator means and said source and fed by said voltages to produce the electric controlling signals defining for each symbol the deflection signal components along to coordinate axes for producing the desired symbol.

3. In a circuit for supplying electric controlling signals defining the signal components along two coordinate axes which correspond to the different sections of the symbols of the typewriter keyboard type to be formed, along those axes, comprising generator means connected to produce in a continuous manner two groups of four substantially sinusoidal voltages, the four voltages of one group being of a same basic frequency and of a same amplitude and phase shifted with reference to one another by $\pi/2$, the four voltages of the second group being of a same frequency double the basic frequency of said one group and of a same amplitude and phase shifted with reference to one another by $\pi/2$, a source supplying at least two D.C. voltages of opposite polarities, at least one further substantially sinusoidal voltage produced by said generator means at the basic frequency of said one group and shifted by $$\frac{n\pi}{4}$$

with reference to one of the voltages of said one group, wherein $n$ is an integer, and said further voltage being biased by a said D.C. voltage of a predetermined sign equal to its effective value, the amplitude of each said further voltage being substantially equal to the amplitude of said voltages of said one group, and a plurality of circuits having inputs connected to said generator means and said source and fed by said different voltages to produce the electric controlling signals defining for each symbol the deflection signal components along two coordinate axes for producing the desired symbol.

References Cited

UNITED STATES PATENTS

| | | | |
|---|---|---|---|
| 1,326,727 | 12/1919 | Hammond | 340—171 |
| 1,356,488 | 10/1920 | Compare | 340—171 |
| 2,406,813 | 9/1946 | De Rosa | 340—171 |
| 2,406,880 | 9/1946 | Young | 178—18 |
| 2,658,942 | 11/1953 | Durkee | 340—171 |
| 2,766,444 | 10/1956 | Sheftelman | 340—318 |
| 2,771,506 | 11/1956 | Coquelet | 340—171 |
| 2,989,702 | 6/1961 | White | 340—324.1 |

NEIL C. READ, *Primary Examiner.*

THOMAS A. ROBINSON, *Examiner.*